(12) United States Patent
Conway et al.

(10) Patent No.: US 10,252,946 B2
(45) Date of Patent: Apr. 9, 2019

(54) COMPOSITE CERAMIC COMPOSITION AND METHOD OF FORMING SAME

(71) Applicant: Corning Incorporated, Corning, NY (US)

(72) Inventors: Bethany Rose Conway, Lindley, NY (US); James William Zimmermann, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/529,847

(22) PCT Filed: Nov. 23, 2015

(86) PCT No.: PCT/US2015/062120
§ 371 (c)(1),
(2) Date: May 25, 2017

(87) PCT Pub. No.: WO2016/085843
PCT Pub. Date: Jun. 2, 2016

(65) Prior Publication Data
US 2017/0260102 A1   Sep. 14, 2017

Related U.S. Application Data

(60) Provisional application No. 62/084,623, filed on Nov. 26, 2014.

(51) Int. Cl.
*C04B 35/58* (2006.01)
*C04B 35/563* (2006.01)
(Continued)

(52) U.S. Cl.
CPC ............ *C04B 35/563* (2013.01); *C04B 35/58* (2013.01); *C04B 35/58064* (2013.01);
(Continued)

(58) Field of Classification Search
None
See application file for complete search history.

(56) References Cited

U.S. PATENT DOCUMENTS 2,613,154 A   10/1952   Montgomery
4,859,124 A    8/1989   Moskowitz et al.
(Continued)

FOREIGN PATENT DOCUMENTS

JP   60103080 A      6/1985
JP   04144968 A  *   5/1992
(Continued)

OTHER PUBLICATIONS

English text machine translation of JP 04-144968 to Mikami et al., PDF pp. 1-5, accessed from Espacenet, patent published in 2004.*
(Continued)

*Primary Examiner* — Katie L. Hammer

(57) ABSTRACT

A composite ceramic composition including a boron carbide phase and a method of forming the same. The composite ceramic composition includes a tungsten boride phase, a transition metal boride phase. The composite ceramic composition may also include a carbon disposed in solid solution with at least the tungsten boride phase and the transition metal boride phase. The transition metal boride phase may include a boride of at least one metal chosen from Cr, Nb, and Zr.

19 Claims, 9 Drawing Sheets

(51) Int. Cl.

| | |
|---|---|
| *C04B 35/626* | (2006.01) |
| *C04B 35/645* | (2006.01) |
| *C09K 5/14* | (2006.01) |
| *H01B 1/02* | (2006.01) |
| *H01B 1/04* | (2006.01) |

(52) U.S. Cl.
CPC ...... *C04B 35/6261* (2013.01); *C04B 35/6264* (2013.01); *C04B 35/645* (2013.01); *C09K 5/14* (2013.01); *H01B 1/02* (2013.01); *H01B 1/04* (2013.01); *C04B 2235/3813* (2013.01); *C04B 2235/3821* (2013.01); *C04B 2235/425* (2013.01); *C04B 2235/602* (2013.01); *C04B 2235/6567* (2013.01); *C04B 2235/6581* (2013.01); *C04B 2235/6586* (2013.01); *C04B 2235/9607* (2013.01)

(56) References Cited

U.S. PATENT DOCUMENTS

| | | | |
|---|---|---|---|
| 4,904,623 A * | 2/1990 | Petzow | C04B 35/563 501/87 |
| 4,957,884 A | 9/1990 | Knudsen et al. | |
| 5,108,962 A | 4/1992 | Khazai et al. | |
| 5,342,811 A | 8/1994 | Khazai et al. | |
| 5,418,196 A | 5/1995 | Nihara | |
| 5,427,987 A | 6/1995 | Mehrotra et al. | |
| 5,505,899 A | 4/1996 | Sigl et al. | |
| 5,554,328 A | 9/1996 | Kondakov | |
| 5,580,836 A | 12/1996 | Mehrotra et al. | |
| 5,632,941 A | 5/1997 | Mehrotra et al. | |
| 5,720,910 A * | 2/1998 | Vlajic | C04B 35/5611 264/29.1 |
| 7,417,002 B2 | 8/2008 | Hirao et al. | |
| 7,442,661 B2 | 10/2008 | Hirao et al. | |
| 8,105,692 B2 | 1/2012 | Dumm et al. | |
| 8,110,165 B2 | 2/2012 | Bar-Ziv et al. | |
| 8,124,553 B2 * | 2/2012 | Okamura | B82Y 30/00 501/87 |
| 8,225,886 B2 | 7/2012 | Mirchandani et al. | |
| 8,789,626 B2 | 7/2014 | Can et al. | |
| 2009/0105062 A1 * | 4/2009 | Thaler | C04B 35/58064 501/96.3 |
| 2009/0121197 A1 * | 5/2009 | Thaler | C04B 35/58071 252/516 |
| 2011/0293461 A1 * | 12/2011 | Duz | B22F 3/24 419/2 |
| 2013/0029175 A1 * | 1/2013 | Umemura | C22C 26/00 428/627 |
| 2013/0196133 A1 | 8/2013 | Keller et al. | |
| 2013/0309468 A1 * | 11/2013 | Kudo | C04B 35/583 501/87 |

FOREIGN PATENT DOCUMENTS

| | | |
|---|---|---|
| JP | 2000302453 A | 10/2000 |
| WO | 1994026469 A1 | 11/1994 |

OTHER PUBLICATIONS

Baharvandi et al. "Processing and Mechanical Properties of Boron Carbide-Titanium Diboride Ceramic Matrix Composites." Applied Composite Materials; 13(3), pp 191-198. 2006.
Bartels et al. "Precipitation of W2B5 and β-WB from Ti0.3W0.4Cr0.3B2 solid solutions." Materials Letters, 62(23), 3836-3838. 2008.
Dehdashti et al. "Effects of temperature and the incorporation of W on the oxidation of ZeB2ceramics" Corrosion Science 80(1) pp. 221-228, 2014.
Grigor'ev et al. "Structure and Properties of Ceramics Based on Tungsten and Titanium Borides and Boron Carbide." Powder Metallurgy and Metal Ceramics, 41(3-4), 142-146. (2002).
Kaga et al. "Synthesis of Hard Materials by Field Activation: The Synthesis of Solid Solutions and Composites in the TiB2—WB2—CrB2 System." Journal of the American Ceramic Society, 84(12), pp. 2764-2770, 2001.
Momozawa and Telle. "Controlled precipitation of Wbplatelets and of -WB nanolaminates for thereinforcement of ternary TiBWBCrBceramics" Journal of the European Ceramic Society 32 (2012), pp. 85-95.
Pohl et al. "Growth behavior and subgrain structure og W2B5" Z. Metallkd. 86(2) 1995, pp. 148-151.
Shibuya et al. "Titanium Diboride-Tungsten Diboride Solid Solutions Formed by Induction-Field-Activated Combustion Synthesis". Journal of the American Ceramic Society, 86(4), 706-710. (2003).
Telle and Petzow, "wear-resistant materials based on boron carbine and borides" 9th International Symposium on Boron, Borides and Related Compounds, Sep. 21-25, 1987. pp. 234-245.
Telle and Pohl. "Reinforcement of TiB2-WB2 solid solutions and B4C-ceramics by In-Situ_Grown WB2-platelets" Proc. 11th Int. Symp. Boron, Borides and Related Compounds, Tsukuba 1993, JJAP Series 10, 1994 pp. 194-197.
Telle, et al. "Boride-based nano-laminates with MAX-phase-like behavior", Journal of Solid State Chemistry 179 (2006) pp. 2850-2857.
Zachariev, "New superhard ternary borides in composite materials" Metal, Ceramic and Polymeric Composites for Various Uses, pp. 61-78. retrieved from www.intechopen.com.

\* cited by examiner

| Peak Location | 1 HP | 1 HT | 2 HP | 2 HT | 3 HP | 3 HT | 4 HP | 4 HT | 5 HP | 5 HT |
|---|---|---|---|---|---|---|---|---|---|---|
| 26.9° | | | | | | | | X | | |
| 27.4° | | | | | | | | | | X |
| 27.8° | | | | | | | | | X | |
| 28.4° | X | X | X | X | X | | | | | |
| 28.7° | | X | | | X | X | | | | |
| 29.8° | | | | | | | | | | |
| 30.5° | X | X | | | | X | | | | |
| 31.5° | | | X | | | | X | X | X | |
| 31.9° | | | X | X | | | X | X | X | X |
| 32.6° | | | | | | | | | | |
| 33.0° | | | | | | | | | | |
| 33.6° | | | | | | | X | X | | X |
| 34.0° | | | | | | | | | | X |
| 34.3° | X | X | X | X | | | | | X | |
| 34.5° | | | | | X | | | | | |
| 34.7° | | X | X | X | | X | X | X | X | X |
| 35.3° | X | X | X | X | X | X | X | X | X | X |
| 35.7° | | | | | | | X | | | |
| 36.5° | X | X | | | | | | | | |
| 37.1° | | | | | | | | | | X |
| 37.8° | | | X | X | X | X | X | X | X | X |
| 39° | | X | X | X | X | X | X | X | X | X |
| 40° | X | X | X | X | X | X | X | | X | X |
| 40.5° | | | | | | | | | | |
| 41° | | | | | | | | | | |
| 42.7° | X | X | | | | | X | X | | |
| 43.7° | X | X | X | X | X | X | X | X | X | X |
| 43.9° | | | | | | X | | | | X |
| 44.5° | | | | | | | | | X | X |
| 45° | X | X | X | X | | | | | | |

FIG. 9

COMPOSITE CERAMIC COMPOSITION AND METHOD OF FORMING SAME

This application is a national stage application under 35 U.S.C. § 371 of International Application No. PCT/US2015/62120, filed on Nov. 23, 2015, which claims the benefit of and priority to U.S. Provisional Patent Application Ser. No. 62/084,623 filed on Nov. 26, 2014, the contents of these applications are relied upon and incorporated herein by reference in their entireties.

FIELD

The disclosure relates to composite ceramic compositions and ceramic materials made from the compositions and articles made therefrom. The composite ceramic compositions comprise boron, carbon, and at least one transitional metal. The compositions can also contain other functional phases, particularly related to phases containing both boron and carbon.

BACKGROUND

Diamond and cubic boron nitride (CBN) are the hardest materials, with hardness values exceeding 70 GPa Vicker's hardness (1 kgf load). These hard materials are very difficult and expensive to make, and thus, are not typically utilized in bulk form. Boron carbide, tungsten carbide, and titanium carbide are other hard materials that are more easily formed, but have less wear resistance as compared to CBN and diamond.

SUMMARY

Exemplary embodiments of the present disclosure provide composite ceramic compositions and ceramic materials made therefrom, and methods of making the same. The composite ceramic composition comprises boron, carbon, and at least one transition metal. According to at least certain embodiments, the ceramic materials are electrically conductive, have a high hardness and/or high fracture toughness as compared to other ceramic materials, and/or have good thermal conductivity.

According to various exemplary embodiments, composite ceramic compositions comprise a boron carbide phase, a tungsten boride phase, a transition metal boride phase comprising a boride of at least one metal chosen from chromium, niobium, and zirconium.

According to further exemplary embodiments, composite ceramic compositions comprise a solid solution comprising titanium, tungsten, boron, and carbon, and at least one metal chosen from niobium, chromium, and zirconium; a boron carbide phase; a tungsten boride phase; and a transition metal boride phase.

According to yet further exemplary embodiments, a method of forming ceramic composite materials comprises preparing a batch composition comprising batch components chosen from boron, carbon, and at least one transition metal, sintering the batch composition, and heat treating the sintered batch composition.

Embodiments of the composite ceramic composition disclosed herein can provide high-temperature-resistant materials having a high toughness and chemical stability.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The accompanying drawings, which are included to provide a further understanding of the disclosure and are incorporated in and constitute a part of this specification, illustrate exemplary embodiments of the disclosure, and together with the description serve to explain the principles of the disclosure.

FIG. 9 includes Table Y, which illustrates X-ray diffraction peak locations of the examples.

DETAILED DESCRIPTION

Figure 1:
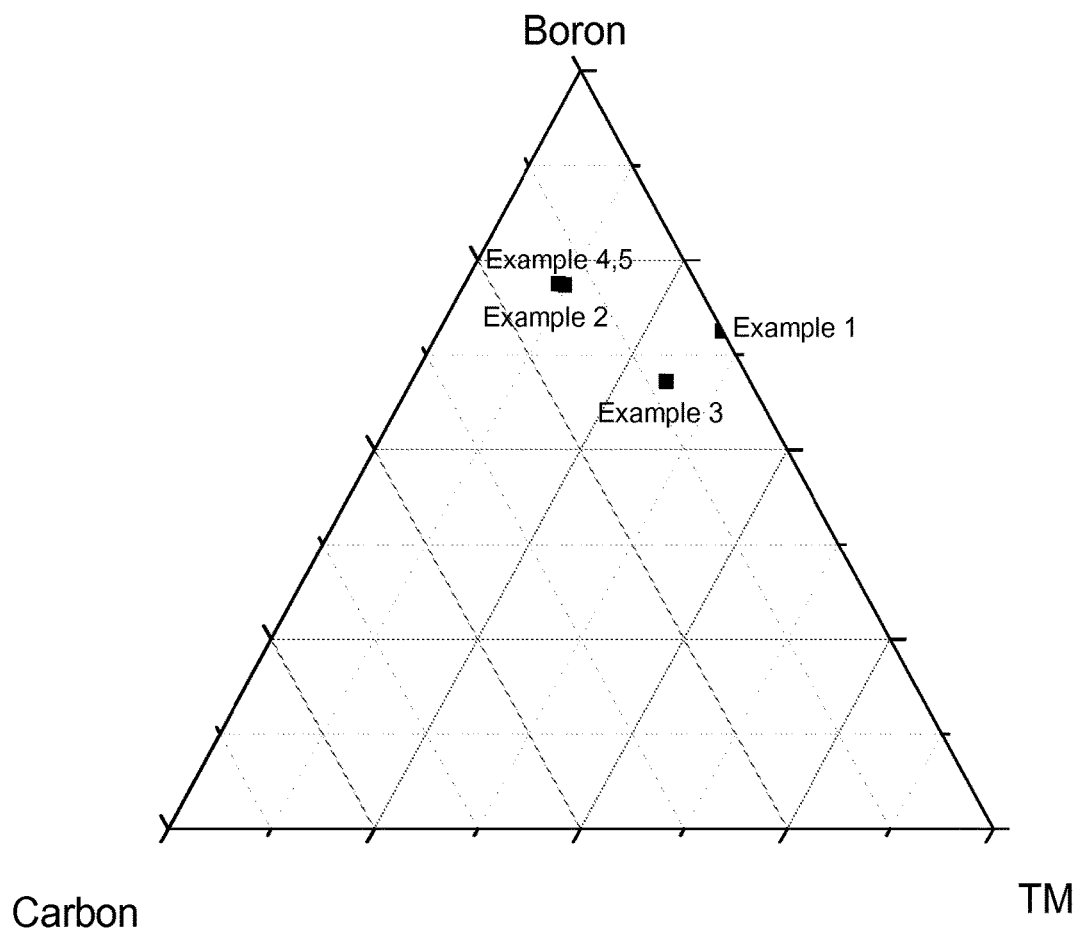
FIG. 1 is a tertiary phase diagram of the five examples, in mole fraction.
Figure 2:
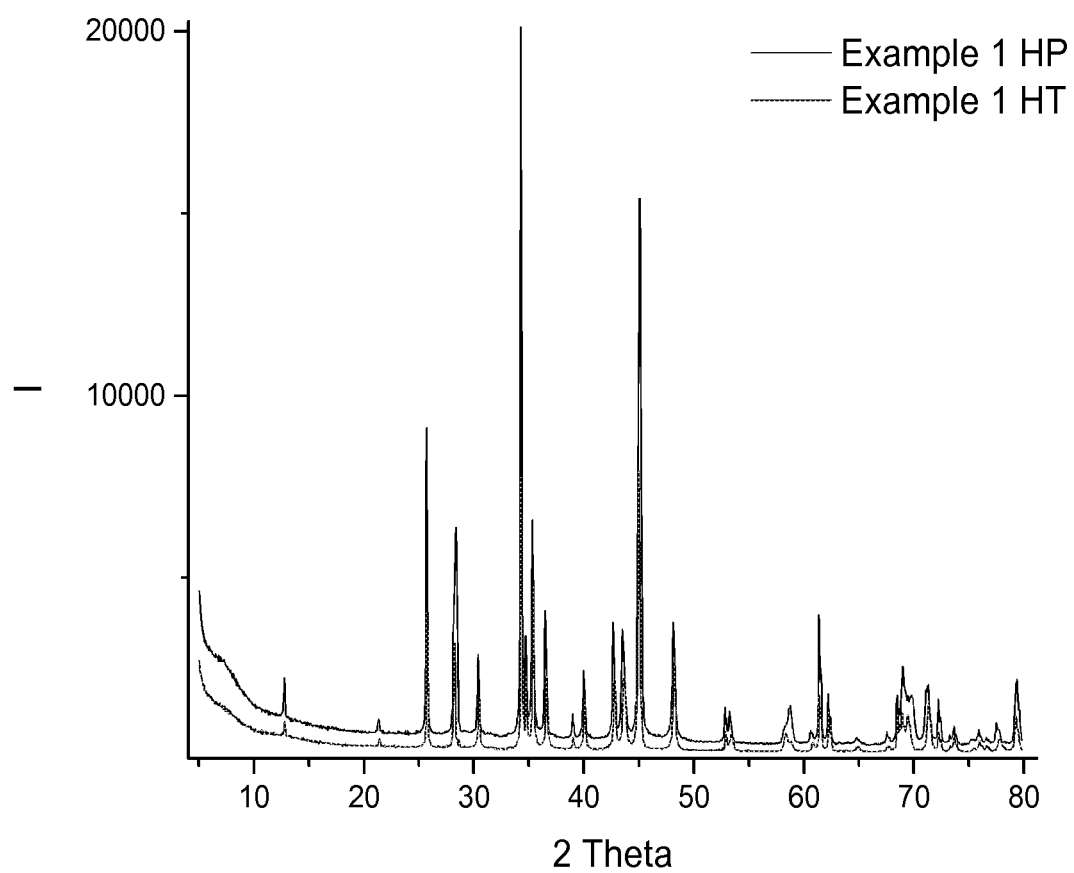
FIG. 2 shows X-ray diffraction patterns of Examples 1 HP and 1 HT.
Figure 3:
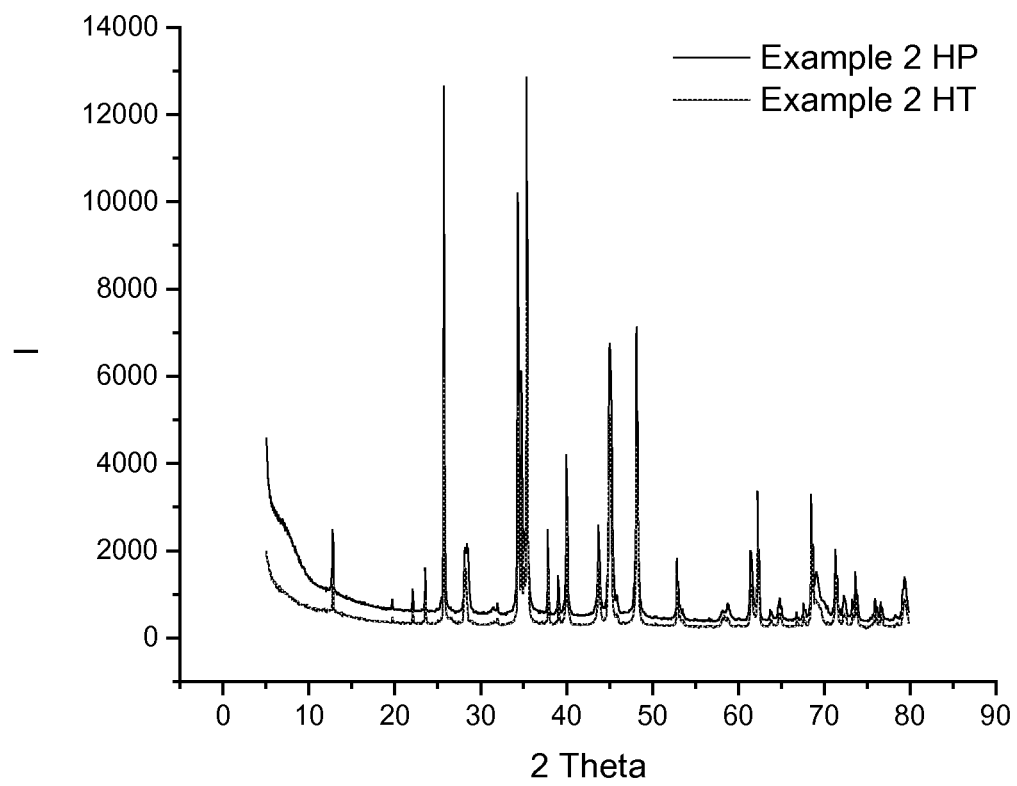
FIG. 3 shows X-ray diffraction patterns of Examples 2 HP and 2 HT.
Figure 4:
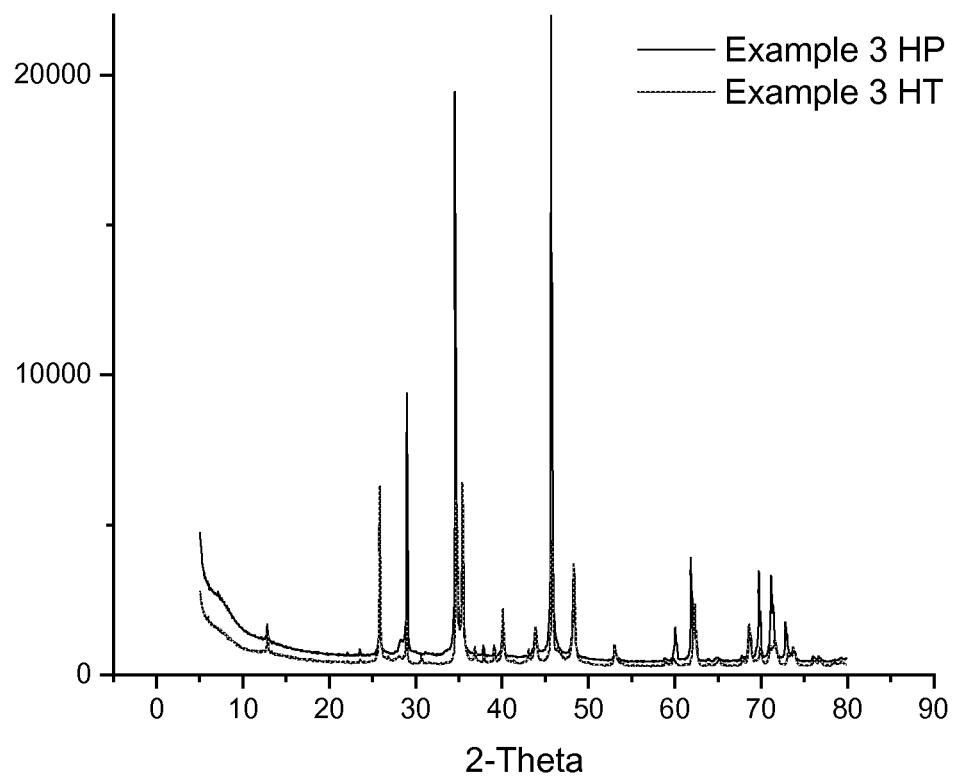
FIG. 4 shows X-ray diffraction patterns of Examples 3 HP and 3 HT.
Figure 5:
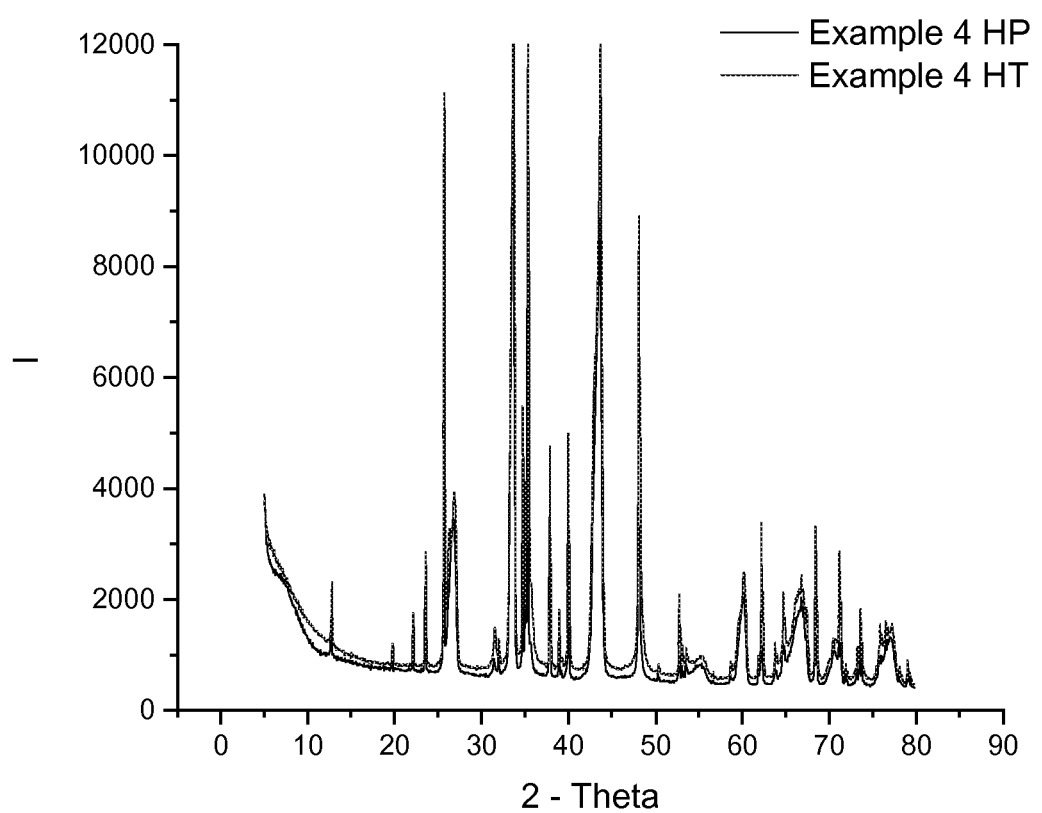
FIG. 5 shows X-ray diffraction patterns of Examples 4 HP and 4 HT.
Figure 6:
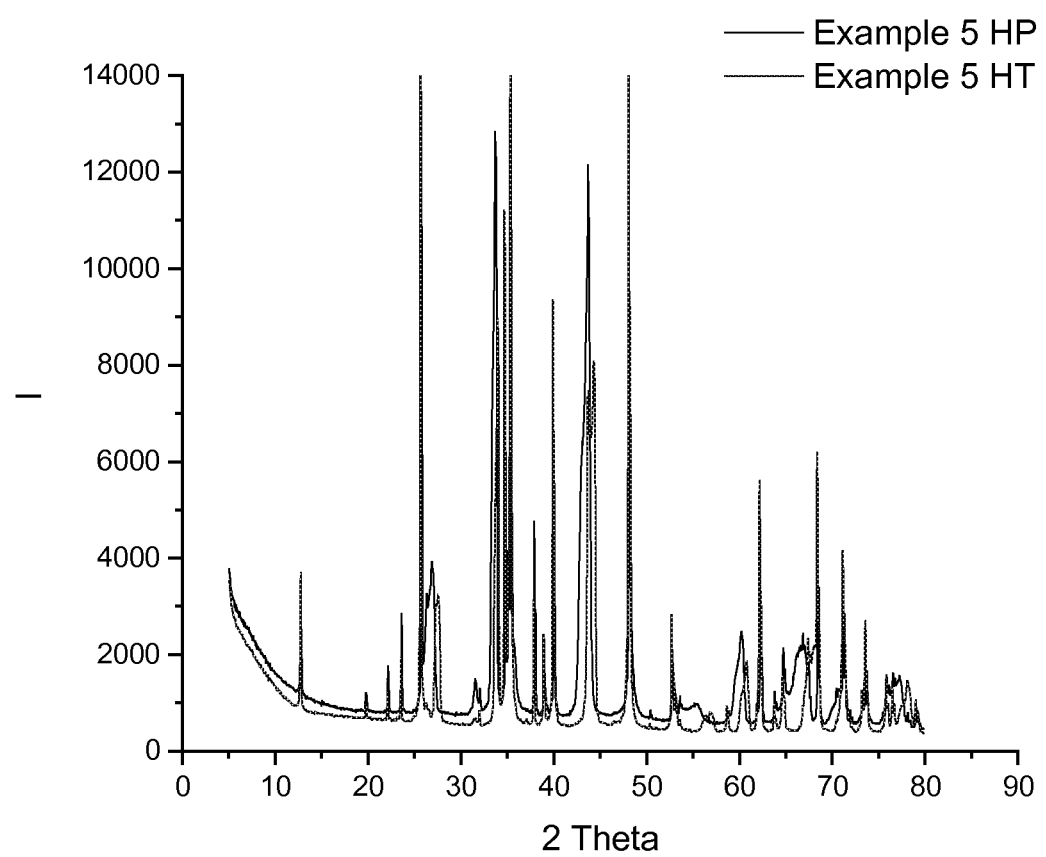
FIG. 6 shows X-ray diffraction patterns of Examples 5 HP and 5 HT.
Figure 7A:
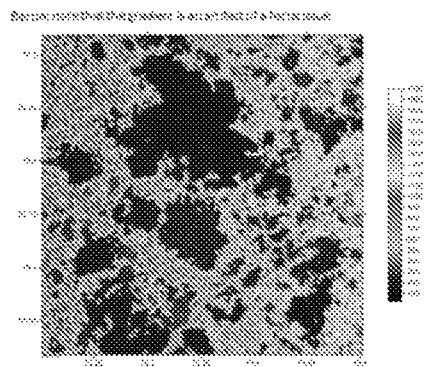
FIGS. 7A-7E show Energy Dispersive Spectroscopy (EDS) elemental maps of Example 2, acquired using a microprobe, for Boron, Carbon, Chromium, Titanium, and Tungsten, respectively.
Figure 7B:
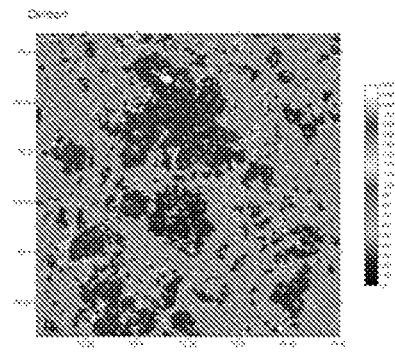
Figure 7C:
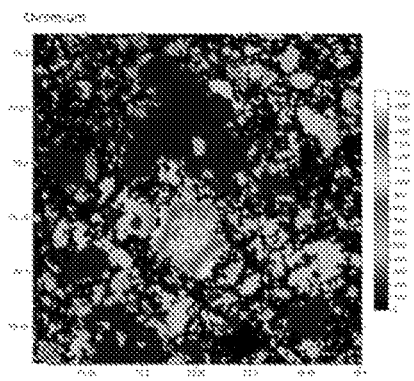
Figure 7D:
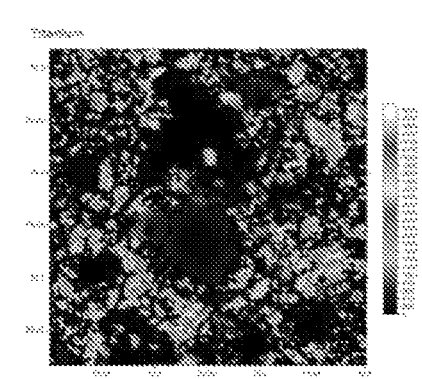
Figure 7E:
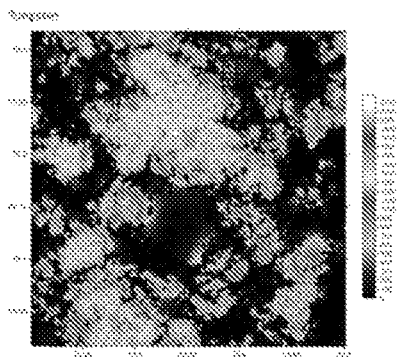

A broad range of industries that have equipment that undergoes abrasive wear, resulting in the need for replacing parts or in some cases the need for the complete rebuilding of the equipment. For example, auger mixing and extrusion equipment such as dies, barrels, and screw elements, are in continuous contact with an abrasive batch. Further exemplary areas include metal cutting, for example hole making, milling, threading, and turning components, and friction stir welding. In these and other industries, there is a need for component parts with sufficient hardness to withstand the intended use thereof, without excessively wearing or fracturing. Thus, there is a need for a wear resistant material that can withstand mechanical loadings.

According to various embodiments, the disclosure relates to composite ceramic compositions including transitional metals ("TM"), boron ("B"), and carbon ("C"). As described, compositions may include a boron carbide phase, a tungsten ("W") boride phase, and a transition metal boride phase. According to various embodiments, the composite ceramic composition may comprise carbon disposed in solid solution with at least the tungsten boride phase and the transition metal boride phase. The transition metals may be chosen from, for example, chromium ("Cr"), niobium ("Nb"), titanium ("Ti"), and zirconium ("Zr").

According to various embodiments, exemplary composite ceramic compositions comprise a boron carbide phase, a tungsten boride phase, a transition metal boride phase comprising a boride of at least one metal chosen from Cr, Nb, and Zr. In yet further embodiments, the transitional metal boride phase comprises borides of at least two metals chosen from Cr, Nb, and Zr. According to various embodiments, the transition metal boride phase may comprise at least one phase chosen from a $CrB_2$ phase, a $Ti_{0.5}Zr_{0.5}B_2$ phase, and an $NbTiB_4$ phase. According to further embodiments, the boron carbide phase comprises at least one phase chosen from a $B_{12}(BC_2)$ phase and a $B_{11.72}C_{3.28}$ phase. According to yet further embodiments, the tungsten boride phase comprises at least one phase chosen from a $W_2B_5$ phase and a $WB_2$ phase.

According to various embodiments, the composite ceramic compositions may comprise a solid solution, for example comprising titanium, tungsten, boron, and/or carbon, and optionally at least one metal chosen from niobium, chromium, and zirconium. By way of non-limiting example, the composite ceramic compositions may comprise carbon disposed in solid solution with the boron carbide phase, the tungsten boride phase, and/or the transition metal boride phase.

According to some embodiments, the compositions may be in the form of a solid body configured for use in a high-wear, high-stress, and/or abrasive environment. For example, the compositions may be in the form dies, barrels, and/or screw elements of extrusion equipment.

According to a further exemplary embodiment, a composite ceramic composition may comprise a boron carbide phase, a tungsten boride phase, a transition metal boride phase, and a solid solution comprising titanium, tungsten, boron, and carbon, and at least one metal chosen from niobium, chromium, and zirconium. The transition metal boride phase may comprise at least one boride of at least one metal chosen from chromium, niobium, and zirconium. Optionally, the carbon may be disposed in solid solution with the boron carbide phase, the tungsten boride phase, and the transition metal boride phase.

According to various embodiments, the carbon in the composite ceramic compositions described herein may comprise graphite. In yet further embodiments, the carbon in the composite ceramic compositions described herein may be free of graphite.

According to various embodiments, the compositions may have a boron to carbon ratio (B:C) ranging from about 2:1 to about 8:1, such as from about 3:1 to about 7:1, or from about 4:1 to about 6:1. By way of example only, compositions may have a boron to carbon ratio ranging from about 4.3:1 to about 5.8:1. According to certain exemplary embodiments, providing carbon to the composite ceramic compositions in a certain amount or at a certain ratio with boron may result in the formation of (1) boron carbide phases, (2) mixed carbide phases in addition to the boride phases, (3) removal of oxide phases due to carbothermic reduction of oxides to the carbide state, and elimination of oxides through carbon-oxide gas phases, and/or (4) solid solutions of carbides and borides resulting in frustrated crystal structures. It should be noted, however, that one or more of these results may not be present according to at least certain embodiments of the disclosure.

According to various embodiments, the compositions may have a transition metal to carbon molar ratio (TM:C) ranging from about 0.5:1 to about 4:1, such as from about 0.6:1 to about 3.5:1. By way of example only, the compositions may have a transition metal to carbon molar ratio of from about 0.68:1 to about 3.06:1.

According to various embodiments, exemplary composite ceramic compositions may comprise from about 0 to about 2 mol % Ti; from about 2 to about 25 mol % W; from about 66 to about 90 mol % B; from about 5 mol % to about 25 mol % C; and at least one additional component chosen from: about 0 mol % to about 25 mol % Nb; about 0 mol % to about 25 mol % Cr; and about 0 mol % to about 25 mol % Zr, wherein a total amount of the Ti, W, Nb, Cr, B, Zr, and C is 100 mol %.

In yet a further exemplary embodiment, a composite ceramic composition may comprise about 3.7 to about 9.3 mol % Ti, about 4.9 to about 12.3 mol % W, about 59.0 to about 71.9 mol % B, about 10.1 mol % to about 16.7 mol % C, and at least one additional chosen from about 2.5 mol % Nb, about 10.3 mol % Cr, and about 2.5 mol % Zr, wherein the total amount of the Ti, W, Nb, Cr, B, and C is 100 mol %.

The disclosure also relates to forming composite ceramic materials comprising the composite ceramic compositions described herein. By way of example, ceramic materials may be formed by preparing a batch composition comprising batch components chosen from boron, carbon, and at least one transition metal as described herein, sintering the batch composition, and heat treating the batch composition. By way of non-limiting example only, the batch composition may be prepared by mixing the batch components, milling the batch composition in a non-polar solvent for a period ranging from about 0.25 hours to about 170 hours, such as about 0.5 hours to about 48 hours. For example, the batch composition may be milled in an organic solvent for a period of about 48 hours. Optionally, the solvent may be removed from the milled batch composition, and the milled batch composition may be sintered. The step of sintering may be performed by any known method, such as, for example, in a hot press, such as a hot isostatic press. The hot press can be performed at a temperature of at least 1700° C., for example, 1800° C., at pressures of greater than 5 MPa. After the batch composition is sintered, a step of heat treating the sintered batch composition may be performed. Heat treating the sintered batch composition may be by any known method, such as in a furnace, at a temperature of below about 1600° C.

As described herein, exemplary batch compositions may comprise (a) from about 13 to about 22.6 mol % Ti powder; (b) from about 15.4 to about 30.1 mol % W powder; and (c) at least one additional component chosen from: (i) about 7.6 mol % Nb powder, about 15.0 mol % boron powder, and about 50.4 mol % $B_4C$ powder; (ii) about 13.0 mol % $CrB_2$ powder and about 56.7 mol % $B_4C$ powder; (iii) about 22.6 mol % $CrB_2$ powder and about 24.7 mol % $B_4C$ powder; and (iv) about 8.9 mol % $ZrB_2$ powder and about 59.4 mol % $B_4C$ powder, wherein the total mol % of the powders (a), (b), and (b) in the batch composition is 100 mol %.

The properties of the composite ceramic compositions may vary depending on, for example, amounts and/or types of the components and phases included therein. However, according to various embodiments, the amounts and types of components in the composite ceramic compositions may be chosen such that properties of hardness, toughness, and/or wear factor thereof are higher than the properties of the individual components thereof, i.e., the transitional metal borides and/or boron carbides.

According to certain exemplary embodiments, the composite ceramic compositions may have a Vickers hardness ranging from about 12 to about 32 GPa, at 1 kgf, and a toughness ranging from about 2 to about 13 MPa*m$^{0.5}$. According to further exemplary embodiments, the composite ceramic compositions may have a Vickers hardness ranging from about 13 to about 31 GPa, at 1 kgf, and a toughness ranging from about 2.5 to about 12 MPa*m$^{0.5}$. In yet further exemplary embodiments the composite ceramic compositions may have a Vickers hardness ranging from about 14 to about 30 GPa, at 1 kgf, and a toughness ranging from about 3 to about 10 MPa*m$^{0.5}$. By way of example only, the composite ceramic compositions may have a Vickers hardness of about 29 GP, at 1 kgf, and a toughness of about 10 MPa*m$^{0.5}$.

The composite ceramic compositions may, according to various exemplary and non-limiting embodiments, comprise $W_2B_5$, which has been reported to form nano-laminates, to be electrically conducting, and to have a high thermal conductivity. For example, the composite ceramic compositions comprising $W_2B_5$ may have an electrical conductivity ranging from about 100 to about 300 S/m, such as about 150 to about 250 S/m, and a thermal conductivity ranging from about 5 to about 50 W/(m*K), such as about 20 to about 40 W/(m*K). By way of non-limiting example only, the electrical conductivity may be about 200 S/M. By way of further non-limiting example, the thermal conductivity may be about 30 W/(m*K).

Accordingly, the ceramic materials made from the composite ceramic compositions may be electrically conducting, may have a high hardness and/or a high fracture toughness relative to other conventional ceramic materials, and may have a good thermal conductivity. The composite ceramic compositions may also have a metallic appearance, which may be important in the acceptance of the compositions in certain metal-dominated applications.

According to various embodiments, the composite ceramic compositions may be useful for preparing components for use in high-wear, high-stress, and/or abrasive environments, such as commercial cutting tools, machining tools, geological drilling bits, hard particle processing, and ceramic processing. For example, the composite ceramic compositions may be used to make forming dies, barrels, and/or screw elements of extrusion equipment. According to further embodiments, the composite ceramic compositions may be used to make a cutting implement, such as a drill bit or saw blade. In yet further embodiments, the composite ceramic compositions may be used to make components for hole making, milling, threading, and/or turning for shaping metallic products. However, the present disclosure is not limited to such embodiments.

The electrical conductivity of the composite ceramic composition is relevant at least because shaping ultra-hard ceramics is time consuming and requires expensive diamond tools, thus making electron discharge machining (EDM) and electrochemical machining (ECM) advantageous. Advanced structures, such as twin screw elements and barrels and forming dies become very expensive to form without at least one of EDM and ECM technology, even when the ceramic body is formed nearly net-shaped. For example, EDM and/or ECM technology can be used for hole drilling and slot cutting in extrusion dies, the slots form axially extending channel walls in an extrudate and can be laid out in various patterns such as square, rectangular, hexagonal, curved, other polygonal shapes, and combinations thereof.

The ultra-hard attributes of the compositions is relevant at least because of the relationship to wear resistance and hardness. Having a high hardness in ceramic particulate processing is also relevant, at least because of the need for the processing equipment to withstand other hard materials. Having a high fracture toughness is relevant in wear applications, and generally in any structural component.

One specific type of material that did not fulfill the requirements, but appeared to have some of the attributes was published by Telle, et al. (Boride-based nano-laminates with MAX-phase-like behavior, Journal of Solid State Chemistry 179 (2006) 2850-2857) where the control $W_2B_5$ platelets and β-WB nanolaminates for the in situ reinforcement of $TiB_2$—$W_2B_4$—$CrB_2$ ceramics is discussed. The mechanical performance of this material was not disclosed by Telle et al. However, a similar material was fabricated (Example 1) and resulted in a hardness of 20 GPa Vicker's (0.2 kgf), which is lower than other boride materials.

It is also to be understood that, as used herein the terms "the," "a," or "an," mean "at least one," and should not be limited to "only one" unless explicitly indicated to the contrary. Thus, for example, reference to "a metal" includes examples having two or more metals unless the context clearly indicates otherwise.

Ranges can be expressed herein as from "about" one particular value, and/or to "about" another particular value. When such a range is expressed, examples include the exact value(s) as alternate start and/or end points. Similarly, when values are expressed as approximations, by use of the antecedent "about," it will be understood that the particular value forms an additional embodiment. It will be further understood that the end points of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method that comprises A+B+C include embodiments where a method consists of A+B+C and embodiments where a method consists essentially of A+B+C.

It is to be understood for the purposes of this disclosure that "at least one of X, Y, and Z" can be construed as X only, Y only, Z only, or any combination of two or more items X, Y, and Z (e.g., XYZ, XYY, YZ, ZZ).

As used herein, a step of "heating at a temperature" is intended to convey that the environment surrounding what is being heated has a temperature as stated. For example, if a batch is heated in a furnace "at a temperature of about 1500° C.," it is intended to convey that the furnace is set a temperature of 1500° C., rather than that the batch itself necessarily reaches a temperature of 1500° C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The disclosure is further described below with respect to the following exemplary Examples and specific embodiments thereof, which are non-restrictive and illustrative only and not intended to be limiting.

EXAMPLES

FIG. 1 shows a tertiary phase diagram that illustrates molar ratios of carbon, boron, and transition metals (TM) included in Examples 1-5 of the present disclosure. Tables V, W, and X, shown below, relate to batch components used in Examples 1-5. In particular, Table V identifies mole percentages of the components of each example shown in FIG. 1. Table W compares mole percentages of transition metals to mole percentages of boron and carbon included in each example. Table X identifies wt %, vol %, and mol % of the batch components (powders) used to form Examples 1-5.

TABLE V

| Example # | TM | Boron | Carbon |
|---|---|---|---|
| 1 | 34.4 | 65.6 | 0 |
| 2 | 12.3 | 71.7 | 16.1 |
| 3 | 30.9 | 59.0 | 10.1 |
| 4 | 11.4 | 71.9 | 16.7 |
| 5 | 11.5 | 71.8 | 16.7 |

TABLE W

| Ex. # | Titanium | Tungsten | Niobium | Chromium | Zirconium | Boron | Carbon |
|---|---|---|---|---|---|---|---|
| 1 | 10.3 | 13.7 |  | 10.3 |  | 65.6 |  |
| 2 | 3.7 | 4.9 |  | 3.7 |  | 71.7 | 16.1 |
| 3 | 9.3 | 12.3 |  | 9.3 |  | 59.0 | 10.1 |
| 4 | 3.8 | 5.1 |  |  | 2.5 | 71.9 | 16.7 |
| 5 | 3.8 | 5.1 | 2.5 |  |  | 71.8 | 16.7 |

TABLE X

| wt % / vol % / mol % | Example 1 | Example 2 | Example 3 | Example 4 | Example 5 |
|---|---|---|---|---|---|
| Titanium | 11.6 / 18.4 / 13.0 | 7.9 / 8.0 / 13.0 | 11.2 / 17.3 / 22.6 | 7.9 / 8.1 / 13.6 | 7.9 / 8.1 / 11.6 |
| Tungsten | 59.2 / 22.0 / 17.3 | 40.3 / 9.5 / 17.3 | 57.4 / 20.6 / 30.1 | 40.3 / 9.7 / 18.1 | 40.2 / 9.7 / 15.4 |
| Niobium |  |  |  |  | 10.0 / 5.4 / 7.6 |
| Chromium diboride (CrB$_2$) | 17.8 / 24.7 / 13.0 | 12.1 / 10.7 / 13.0 | 17.2 / 23.2 / 22.6 |  |  |
| Zirconium diboride (ZrB$_2$) |  |  |  | 12.1 / 9.2 / 8.9 |  |
| Boron | 11.4 / 34.9 / 56.7 |  |  |  | 2.3 / 3.8 / 15.0 |
| Boron Carbide (B$_4$C) |  | 39.7 / 71.8 / 56.7 | 14.1 / 38.9 / 24.7 | 39.7 / 73.0 / 59.4 | 39.7 / 73.0 / 50.4 |

With regard to FIG. 1 and Tables V-X, Example 1 is the prior art chemistry reported by Telle et al., although the processing method differs from the reported method and is similar to the method utilized in the other examples in this disclosure.

Example 2 has the same boron:TM ratio as Example 1, but has carbon addition (FIG. 1). The boron precursor in Example 1 was amorphous boron powder, and the addition of boron and carbon in Example 2 was in the form of boron carbide.

Example 3 has the same boron:carbon ratio, but has a different boron:TM ratio than Examples 1 and 2. Example 4 has similar boron:TM and boron:carbon ratios to Examples 3 and 5, but substitutes additional IVB transitional metal (zirconium) for the VIB transition metal (chromium) utilized in examples 1-3.

Example 5 has similar boron:TM and boron:carbon ratios as Examples 3 and 4, but substitutes a VB transitional metal (niobium) for the VIB metal (chromium) utilized in examples 1-3. The four compositions of Examples 2-5 demonstrate a large chemistry range for the formation of the transitional metal boride-transitional metal carbide-boron carbide composites.

Processing

The batch components of Examples 1-5, as listed in Table X, were weighed and then ball milled on a roller mill using a hexane solvent. ¼" tungsten carbide (Union Process media likely to be cemented carbide) was used as media for Examples 1-3 and 5. These batches were milled for 48 hrs. The hexane was removed from Examples 1-3, using a rotary evaporator at a rotation speed of 400 rpm and temperature of 68° C. and the hexane was removed from Examples 4 and 5 by decanting the excess hexane and then drying in argon at 90° C. The resultant powders were then placed into an 18 mm graphite die lined with graphite foil coated with boron nitride.

Example 4 was ball milled with a hexane solvent and ³⁄₃₂" tungsten carbide media. The media was removed by rinsing off with hexane through a stainless steel mesh colander. The batch material and hexane solvent was transferred to a crystallizing dish, and then placed in an argon atmosphere and heated to 90° C. to evaporate the solvent. The resultant powder was then placed into an 18 mm graphite die lined with graphite foil coated with boron nitride.

An attrition mill (union process) was also utilized for Examples 2-5. Batch components were weighed and milled in hexane with ³⁄₃₂" tungsten carbide media for 60 min, at 600 rpm. These batch components were milled in a 750 ml Tefzel fluoropolymer resin lined container. A Tungsten carbide agitator arm was used for mixing. The media was removed by rinsing with hexane through a stainless steel mesh colander. The batch material and hexane solvent was transferred to a crystallizing dish, and then placed in argon atmosphere and heated to 90° C. to evaporate the solvent. The powder was then loaded into a 32 mm graphite die lined with graphite foil. The graphite foil was coated with boron nitride.

The graphite die for Examples 1-5 were sintered in a hot press (GT Advanced Technologies). In particular, the samples were heated to 1500° C. and held for 2 hours, under vacuum. After the 2 hour soak the furnace was ramped up to 1900° C., the vacuum was turned off, and flowing argon was introduced. A pressure of 30 MPa was applied to the powder compact and the furnace was held at 1900° C., for 1 hour. All the examples were heat treated in a graphite vacuum furnace in argon at 1500° C., for 76 hrs. Examples 1-5 were cooled to room temperature prior to being heat treated.

Analysis

X-ray diffraction ("XRD") methods were used to determine the products of the reactive hot pressed materials. Bartles et al. reported that chemistry similar to Example 1 (different precursors) produced x-ray peaks at 33 and 40° Bragg angles, in the as-homogenized state. After heat treating, Bartles et al. report peaks at approximately 30°, 40.5°, and 41°, correlating to a $W_2B_5$ phase at 32.5°, a $TiB_2$ phase at 40°, and a ß-WB phase at 35°.

Figure 8:
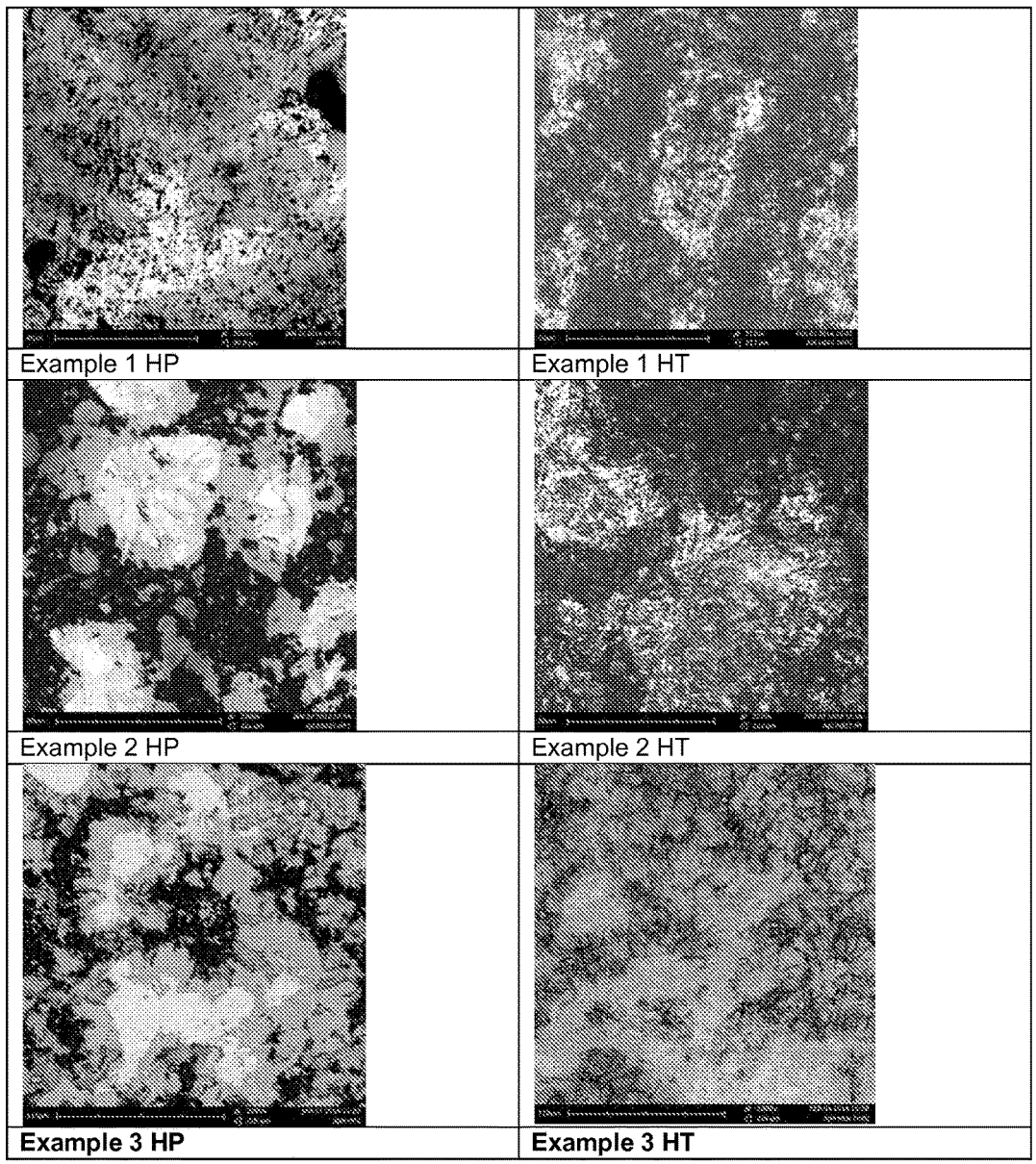
FIG. 8 shows electron micrographs of Examples 1HP, 1HT, 2HP, 2HT, 3HP, and 3HT.

FIGS. 2-6 present the XRD patterns for both hot pressed ("HP") and heat treated ("HT") compositions of Examples 1-5. The peaks for Examples 1-5 within the range of 27 to 45° Bragg angles are reported in Table Y shown FIG. 8. Table Y allows for a +/−0.2° shift unless a doublet is reported, or if the peak is in between a doublet of another material. Exact identification of materials using x-ray diffraction becomes difficult in materials that have over lapping peaks or materials that form solid solutions resulting in shifts of the peaks.

Table Z includes potential phases for Examples 1-5. Table Z also includes hardness (10 kg force), wear resistance, and toughness measurements for these compositions.

TABLE Z

| Sample | Identified Phases | H (GPa) | $K_{IC}$ (MPa * m$^{-5}$) | WRF |
|---|---|---|---|---|
| Example 1 HP | $TiB_2$, $WB_2$, WB | 15 | 5.4 | 14 |
| Example 1 HT | $W_2B_5$, $TiB_2$, $(Ti_{1.6}W_{2.4})B_4$ | Spalling | 6.9 | |
| Example 2 HP | $WB_2$, $TiB_2$, $B_{10}C$ | Spalling | 4.6 | |
| Example 2 HT | $W_2B_5$, $TiB_2$, $B_{12}(BC_2)$ | 25 | 9.7 | 27 |
| Example 3 HP | $WB_2$, $CrB_2$, $B_{10}C$ | Not Tested | Not Tested | |
| Example 3 HT | $W_2B_5$, $CrB_2$, $B_{12}(BC_2)$, WB | 22.5 | 2.4 | 9.0 |
| Example 4 HP | $WB_2$, $B_{12}(BC_2)$, $Ti_{0.5}Zr_{0.5}B_2$ | 14 | 4.7 | 16 |
| Example 4 HT | $WB_2$, $B_{11.72}C_{3.28}$, $Ti_{0.5}Zr_{0.5}B_2$, WC, graphite | Spalling | 3.5 | |
| Example 5 HP | $TiB_2$, $WB_2$, $B_{11.72}C_{3.28}$, WC, graphite | 30 | 5.1 | 19 |
| Example 5 HT | $WB_2$, $W_2B_5$, $B_{11.72}C_{3.28}$, $NbTiB_4$, $Ti_{0.5}Nb_{0.5}B_2$, graphite | 29 | 5.9 | 20 |

FIGS. 6A-6E show electron dispersive spectroscopy (EDS) images for Example 2, taking using a microprobe, which illustrate concentration gradients for Boron, Carbon, Chromium, Titanium, and Tungsten, respectively. This technique generally allows for quantitative elemental analysis. However, due to the combination of light and heavy elements within the material the quantitative analysis may have a higher error rate. As shown in the microprobe EDS maps of FIGS. 6A-6E, the phases within Table Z may not be entirely accurate. Instead, most of the transitional metal borides have carbon intermixed within. The majority of the boron and carbon are located in the absence of transitional metals, and thus, are likely the $B_xC_y$ phases. Further, carbon and boron are dispersed throughout Example 2. In contrast, titanium, boron, and tungsten are localized in more discrete regions. These results are consistent with the phase formation described above.

The microstructure as processed in the disclosed methods results in a chemically heterogeneous microstructures with features that are on the size scale of 10 to 100 μm. The grain sizes are smaller than the features and many of the features are composed of different phases.

The Vicker's hardness of Examples 1-3 was also measured using a 0.2 kilogram force load. This method resulted in very fine indentations and values of 19, 21, and 31 GPa for Examples 1, 2 and 3, respectively. Due to the size of the indentation, the error is high.

Referring to Table Z, the toughness of Examples 2-5 was measured using Vicker's indentation using the direct indentation method. A 10 kilogram force was utilized to indent the surface and the cracks extending from the surface were measured. Using this method, the Example 2 composition was shown to have an apparent toughness value of 9.7 MPa*m$^{1/2}$. The hardness of Example 2 using a one kilogram force was 25 GPa and the Young's modulus was 402 GPa. The combination of a hardness value of 25 GPa and a toughness value of 9.7 MPa*m$^{1/2}$ results in a calculated wear resistance factor of 27 ($K_{IC}^{3/4}$*H$^{1/2}$), which is higher than the other materials reported other than CBN and diamond. Accordingly, the amounts of C and Cr included in Example 2 produced compositions having excellent hardness, toughness, and wear factor.

The results from Examples 2-5 also appear to indicate that Cr allows more carbon into the composition matrix of heat treated compositions than Zr and Nb, as indicated by the precipitation of carbon (graphite) in Examples 4 and 5, but not in Examples 2 and 3. As shown in Example 5, the included amount of Nb produced a composition having a higher hardness, and a slightly lower toughness and wear factor, as compared to Example 2.

According to various embodiments, the present disclosure provides composite ceramic compositions that exhibit a high hardness, toughness, and wear factor. The compositions are also electrically conductive, which beneficially allow the compositions to be processed using electron discharge machining.

It will be apparent to those skilled in the art that various modifications and variation can be made in the present disclosure without departing from the spirit or scope of the disclosure. Thus, it is intended that the appended claims cover the modifications and variations of this disclosure provided they come within the scope of the appended claims and their equivalents.

What is claimed is:

1. A composite ceramic composition comprising:
   a boron carbide phase;
   a tungsten boride phase; and
   a transition metal boride phase comprising a boride of at least one metal chosen from Cr, Nb, and Zr,
   wherein the composition comprises a boron to carbon molar ratio ranging from about 2:1 to about 8:1.

2. The composition of claim 1, wherein the transition metal boride phase comprises borides of at least two metals chosen from Cr, Nb, Ti, and Zr.

3. The composition of claim 1, further comprising carbon disposed in solid solution with at least one of the boron carbide phase, the tungsten boride phase, and the transition metal boride phase.

4. The composition of claim 1, wherein the transition metal boride phase comprises at least one phase chosen from a $CrB_2$ phase, a $Ti_{0.5}Zr_{0.5}B_2$ phase, and an $NbTiB_4$ phase.

5. The composition of claim 1, wherein the boron carbide phase comprises at least one phase chosen from a $B_{12}(BC_2)$ phase and a $B_{11.72}C_{3.28}$ phase.

6. The composition of claim 1, wherein the tungsten boride phase comprises at least one phase chosen from a $W_2B_5$ phase and a $WB_2$ phase.

7. The composition of claim 1, wherein the composition comprises a transition metal to carbon molar ratio of from about 0.5:1 to about 4:1.

8. The composition of claim 1, wherein the composition has:
a Vickers hardness ranging from about 14 to about 30 GPa at 1 kgf; and
a toughness ranging from about 3 to about 10 MPa*m$^{0.5}$.

9. The composition of claim 1, wherein the composition has a wear resistance factor ranging from about 14 to about 30 ($K_{IC}^{3/4}*H^{1/2}$).

10. The composition of claim 3, wherein the carbon disposed in solid solution comprises graphite.

11. The composition of claim 3, wherein the carbon disposed in solid solution is free of graphite.

12. The composition of claim 1, wherein the transition metal boride phase comprises a solid solution of chromium boride and titanium boride.

13. The composition of claim 1, wherein the composition has an electrical conductivity ranging from about 100 to about 300 S/m.

14. The composition of claim 1, wherein the composition has a thermal conductivity ranging from 5 to 50 W/(m*K).

15. The composition of claim 1, further comprising:
a solid solution comprising titanium, tungsten, boron, carbon, and compounds thereof, and at least one metal chosen from niobium, chromium, and zirconium.

16. The composition of claim 15, wherein the carbon is disposed in solid solution with at least one of the boron carbide phase, the tungsten boride phase, and the transition metal boride phase.

17. A composite ceramic composition comprising:
about 3.7 to about 9.3 mol % Ti;
about 4.9 to about 12.3 mol % W;
about 59.0 to about 71.9 mol % B;
about 10.1 mol % to about 16.7 mol % C; and
at least one additional component chosen from Nb, Cr, and Zr,
wherein a total amount of the Ti, W, Nb, Cr, B, Zr, and C is at least 95 mol %.

18. A composite ceramic composition comprising:
about 3.7 to about 9.3 mol % Ti;
about 4.9 to about 12.3 mol % W;
about 59.0 to about 71.9 mol % B;
about 10.1 mol % to about 16.7 mol % C; and
at least one additional component chosen from:
about 2.5 mol % Nb;
about 10.3 mol % Cr; and
about 2.5 mol % Zr,
wherein a total amount of the Ti, W, Nb, Cr, B, Zr, and C is at least 95 mol %.

19. The composition of claim 2, wherein a total amount of the Ti, W, Nb, Cr, B, Zr, and C is at least 95 mol %.

* * * * *